(12) United States Patent
Telnack

(10) Patent No.: US 6,457,766 B1
(45) Date of Patent: Oct. 1, 2002

(54) VEHICLE STREAMLINING STRUCTURE

(76) Inventor: Lee J. Telnack, 7143 Bayview Dr. NE., Olympia, WA (US) 98506

( * ) Notice: Subject to any disclaimer, the term of this patent is extended or adjusted under 35 U.S.C. 154(b) by 0 days.

(21) Appl. No.: 10/053,397

(22) Filed: Nov. 10, 2001

(51) Int. Cl.[7] .............................................. B62D 35/00
(52) U.S. Cl. .................................. 296/180.4; 296/180.1
(58) Field of Search ........................... 296/180.1, 180.2, 296/180.4; 105/1.1

(56) References Cited

U.S. PATENT DOCUMENTS

| | | |
|---|---|---|
| 2,737,411 A | 3/1956 | Potter |
| 3,814,472 A | 6/1974 | Zelikovitz |
| 4,006,932 A * | 2/1977 | Mcdonald |
| 4,036,519 A | 7/1977 | Servais et al. |
| 4,236,745 A | 12/1980 | Davis |
| 4,401,338 A | 8/1983 | Caldwell |
| 4,553,781 A | 11/1985 | Johnson |
| 4,741,569 A | 5/1988 | Sutphen |
| 4,978,162 A | 12/1990 | Labbée |
| 5,058,945 A | 10/1991 | Elliott, Sr. et al. |
| 5,236,347 A | 8/1993 | Andrus |
| 5,782,521 A | 7/1998 | Anderson |
| 5,823,610 A | 10/1998 | Ryan et al. |
| 6,017,082 A | 1/2000 | Leoni |
| 6,409,252 B1 * | 6/2002 | Andrus .................... 296/180.4 |

* cited by examiner

Primary Examiner—Joseph D. Pape
(74) Attorney, Agent, or Firm—Glenn S. Arendsen

(57) ABSTRACT

Two layers of a flexible and essentially impervious material are sealed to each other at their edges and are otherwise separate from each other so as to form an interior portion. Many lengths of thread connect the layers together at numerous points throughout the interior portion. The length of the thread that is between the layers is relatively short and the thread connects the layers at a sufficient number of points to restrain the layers and hold them in a spaced relationship when the interior portion is inflated with air. Applying modest air pressure to the interior portion produces a lightweight structure of sufficient stiffness that is attached to the rear ends of truck trailers to improve airflow and reduce drag at highway speeds.

20 Claims, 3 Drawing Sheets

VEHICLE STREAMLINING STRUCTURE

BACKGROUND OF THE INVENTION

1. Field of the Invention

This invention provides a structure for reducing the aerodynamic drag of a vehicle and a vehicle having reduced aerodynamic drag during highway operation. The invention is applicable primarily to trucks and semi-trucks that travel on the interstate highway system.

2. Brief Description of the Prior Art

Higher energy costs have focused attention on reducing the aerodynamic drag of trucks and semi-trucks. These vehicles typically travel interstate highways for long distances with payloads of 18,000 to 36,000 kg (20 to 40 tons) and at speeds of 100–130 km per hour (60 to 80 miles per hour).

The typical trailer of these vehicles has a squared-off rear end with large doors that pivot around vertical axes to fold back along the sides of the trailer, thereby enabling backing the trailer firmly against raised loading and unloading docks. This in turn enables forklifts and other powered vehicles to move into and out of the trailer readily to assist in loading and unloading.

But the squared-off rear end creates significant aerodynamic turbulence during operation at highway speeds, and the turbulence results in increased drag and increased fuel consumption. An inflatable streamlining apparatus for reducing the aerodynamic turbulence at the rear end of semi-trailers was proposed nearly fifty years ago in U.S. Pat. No. Potter 2,737,411. The apparatus included a flexible bag that was inflated during highway operation to a shape that minimized aerodynamic drag at the rear of a truck. During operation in close quarters and during loading and unloading, deflating the bag enabled built-in springs to roll it up against the rear doors of the trailer to minimize interference.

The Potter apparatus did not achieve commercial acceptance even though the benefits of reducing the aerodynamic drag of over-the-road vehicles were recognized and verified. Accordingly many improvements to inflatable streamlining structure like that taught by Potter were proposed and developed over the years. Improvements were directed at including internal and external belts to improve the shape of the flexible bag and achieve better aerodynamic efficiency, using vortex generators to smooth airflow over the bag, using ram air generated by vehicle motion to inflate the bag (and which was intended to deflate the bag automatically when the vehicle stopped in preparation for docking), including a system of ropes and pulleys to pull a deflated flexible bag into a storage position above or below the trailer, and including internal structural elements to provide a desired aerodynamic shape of the bag when in use on the highway and enable folding of the bag against the rear doors of the vehicle for low speed operation and docking.

Nonetheless, commercial acceptance of apparatus like that proposed by Potter and the resulting benefit of reduced fuel consumption have not been achieved.

SUMMARY OF THE INVENTION

This invention provides an improved structure for reducing the aerodynamic drag of a vehicle that is more efficient to inflate and deflate and is readily removable from an obstructing position on the vehicle doors to more readily facilitate low speed operation and docking. The structure comprises at least two layers of flexible material having peripheral portions and interior portions. The peripheral portions of each layer are pneumatically sealed to each other. Connecting and restraining means extend through the interior portions at multiple points and connect the interior portions of the layers to each other while restraining separation of the layers from each other for a controlled distance so that the interior portions of the layers are in a spaced relationship to each other. Air admitting means are attached to the layers for inflating the space between the interior portions of the layers to impose tension within the connecting and restraining means.

The structure is attached to a vehicle by attaching rope means to the peripheral portions, attaching channel means to the vehicle, and fitting the rope means into the channel means. Preparing the vehicle for highway operation involves a simple operation of inflating the interior portion of the layers to a suitable and relatively modest pressure. The layers and the connecting and restraining means are assembled so that the resulting structure is shaped when inflated to improve the aerodynamic flow at the end of a vehicle trailer. The combination of the layers, the restraining means, and the inflation pressure results in an essentially rigid and light weight structure having a shape that minimizes air turbulence at the rear end of the vehicle during highway operation and improves aerodynamic efficiency.

Preferred connecting and restraining means comprise inter-stitching the layers together in various patterns. The inter-stitching holds the interior portions of the layers in a spaced relationship wherein the interior portions of the layers are separated by twenty-five to seventy-five millimeters (one to three inches). A zig zag pattern with stitching frequency of one stitch per mm, the legs of the zig zags ten millimeters long, and the zig zags spaced by ten millimeters produces a structure that is particularly useful for interstate highway travel. The connecting and restraining means can include a fibrous material that partially fills the interior portions. The lengths of the inter-stitching can be varied along several lines of the interior portions to provide built-in ridges and grooves that assist in achieving and maintaining smooth, laminar air flow over the structure under the variable conditions encountered during highway operation.

The structure is lightweight but sufficiently rigid to maintain its design shape despite buffeting caused by cross winds and traffic effects. When the vehicle is operating at low speeds or is being prepared for docking, a simple operation of deflating the layers and either folding them against the doors of the trailer or removing them from the vehicle enables ready access to the interior of the trailer.

In a preferred embodiment particularly suited to semi trailers with left and right doors that swing open about vertical axes formed by hinges at each side of the rear end of the trailer, a structure of the invention is attached separately to each door. The peripheral portions of each structure that face each other when the doors are closed are essentially square and fit against each other as the rear doors of the trailer are closed. A zipper or velcro fastener attaches these peripheral portions to each other to form a continuous aerodynamic shape.

DESCRIPTION OF THE PREFERRED EMBODIMENT

Figure 1:
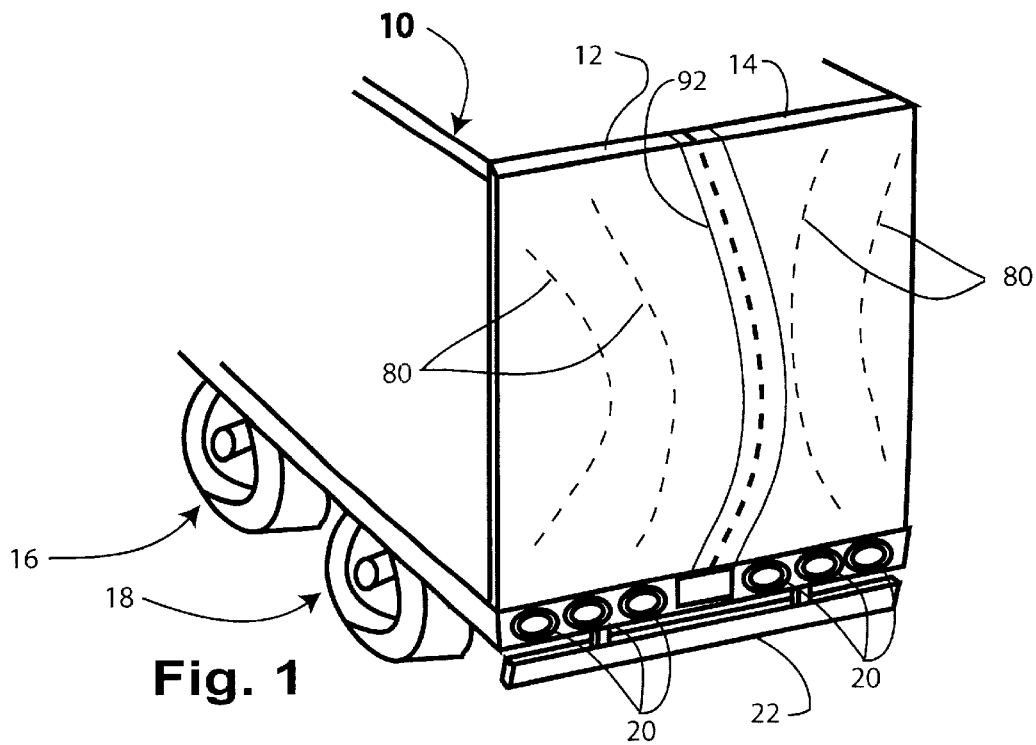
FIG. 1 is a perspective view of the rear end of a trailer for a semi-truck with the rear doors of the trailer closed to show the structure of this invention in place where it would perform aerodynamic improvement during highway operation.
Figure 2:
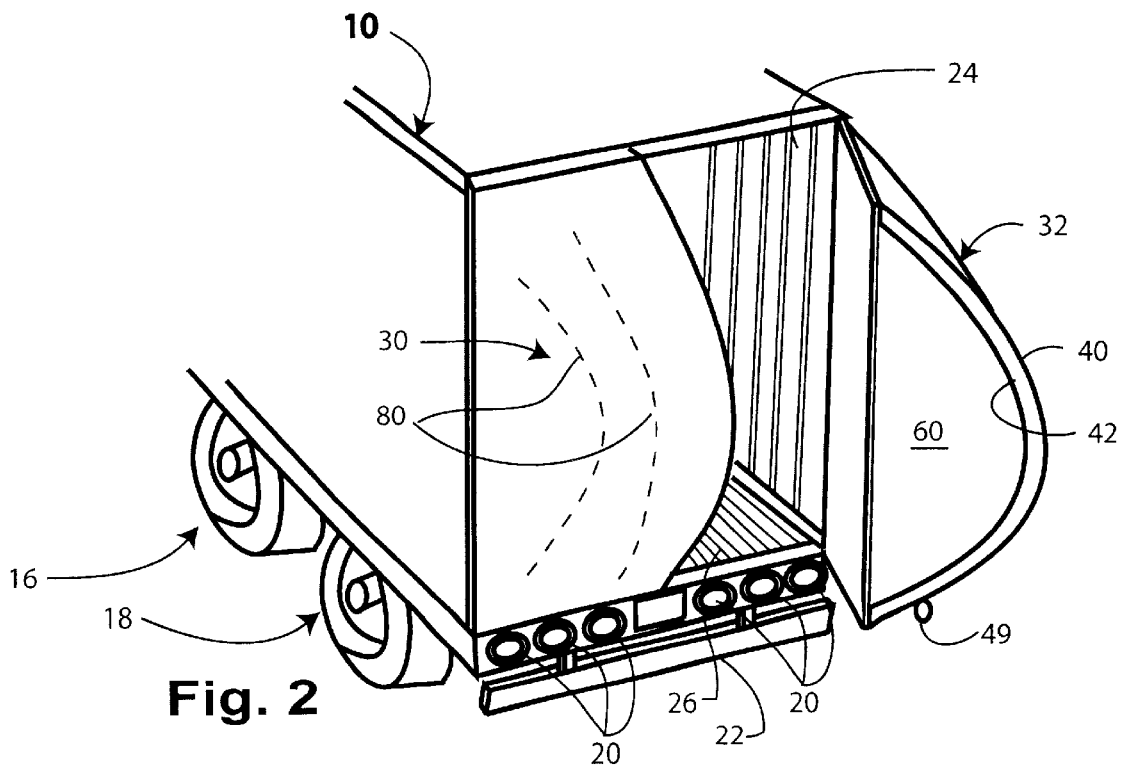
FIG. 2 shows the trailer of FIG. 1 with one of the rear doors open.

Referring to FIGS. 1 and 2, the trailer 10 of a semi-truck has left and right doors 12 and 14 at its rear end that open by swinging about vertical axes formed by hinges (not shown) at each side of the trailer. The trailer is supported by conventional axles and wheels indicated generally by 16 and 18. Tail lamps, brake lamps, and turn signal lamps 20 are mounted at the lower edge of the rear end of the trailer above a bumper 22. Trailer 10 has interior walls 24 and flooring 26 suitable as desired for containing appropriate loads.

Figure 3:
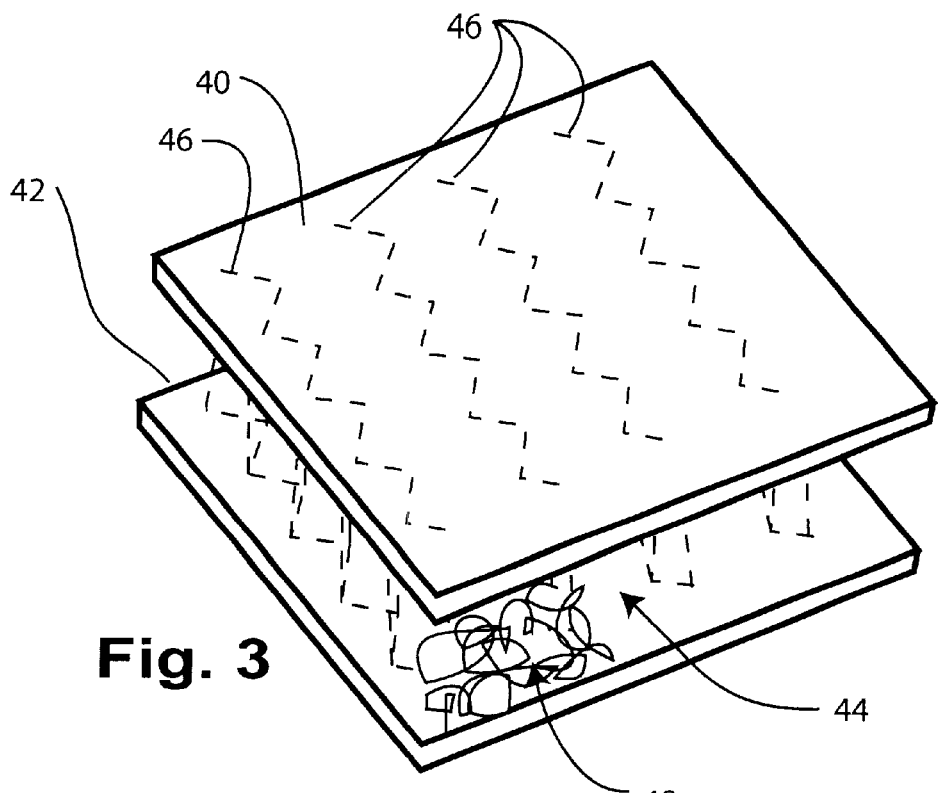
FIG. 3 is a cross section of the flexible material used in the structure that shows the two layers of material, the inflatable interior portion between the layers, and the inter-stitching that holds the two layers together in a spaced relationship.
Figure 4:
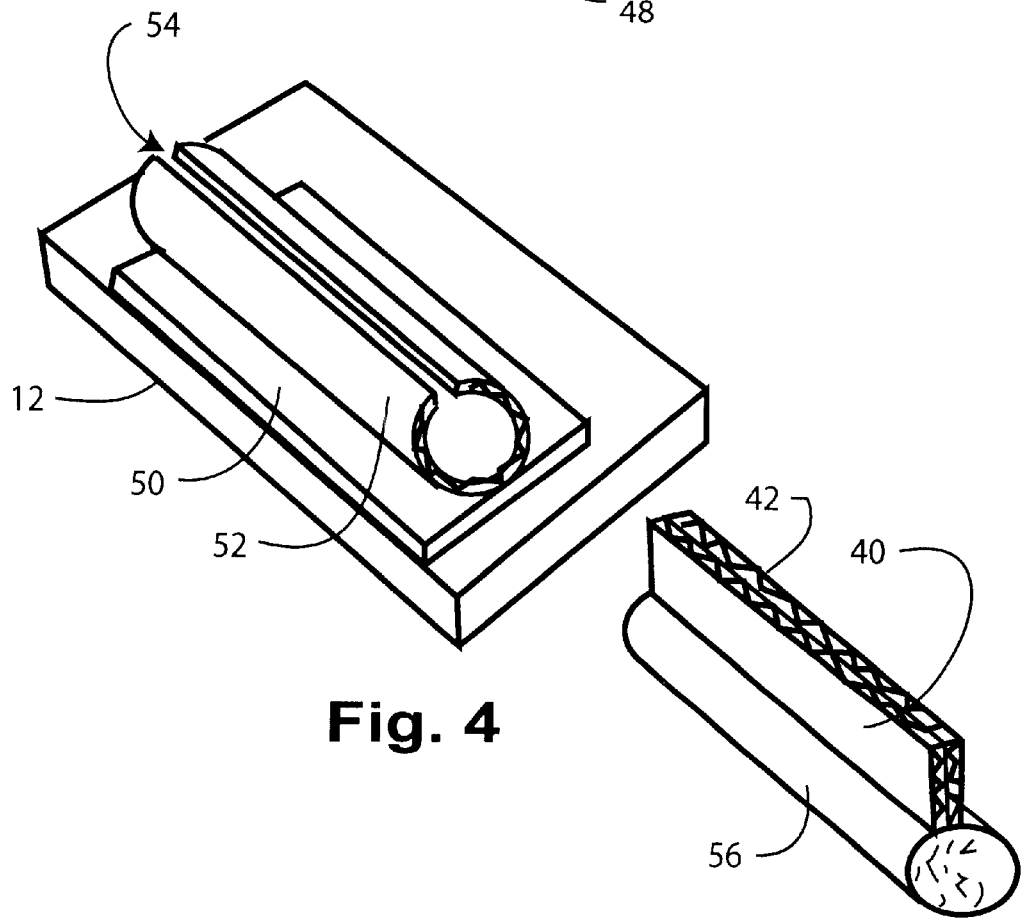
FIG. 4 is a perspective of the flexible rope and channel construction that is used to attach the structure to the trailer.

Structure 30 is attached to left door 12 and structure 32 is attached to right door 14. Referring also to FIGS. 3 and 4, each of structures 30 and 32 comprises two layers 40 and 42 of a flexible and essentially impervious material. Layers 40 and 42 are sealed to each other at their peripheral edges, one of which is shown in FIG. 4, and are otherwise separate from each other so as to form an interior portion 44.

Thread 46 connects layers 40 and 42 together at numerous points throughout the interior portion 44. The length of thread 46 that is between the layers is relatively short and thread 46 connects layers 40 and 42 at a sufficient number of points to connect and restrain the interior portions of the layers and hold them in a spaced relationship even when the interior portions 44 are inflated with air. A fibrous material 48 made of carbon fiber that is pervious to air can be bonded to the inner surfaces of layers 40 and 42 at various parts of the interior portions as desired to achieve desired shape and stiffness of the resulting structure. A nozzle 49 for filling space 44 with air is located near the bottom of structure 32 and a similar nozzle (not shown) is located near the bottom of structure 30. Applying thread 46 in the zig-zag pattern illustrated in FIG. 3 produces a strong and stable structure when inflated to relatively low pressures.

FIG. 4 shows a preferred means of attaching peripheral edges of structures 30 and 32 to doors 12 and 14 of the trailer and uses left door 12 as illustrative. As shown in FIG. 4, a plate 50 has a circular tube 52 attached to one surface by, for example, welding or spot welding. Tube 52 has an open longitudinal slot 54 on its top or outer surface. The plate and tube assembly is fastened to door 12 by rivets or threaded fasteners (not shown) that pass through the plate and position the tube along the top, bottom, and left edges of door 12.

The sealed edges of layers 40 and 42 are attached to a flexible bolt rope 56 shown in cross section in FIG. 4. When deflated, structure 30 is flexible and pliable, and bolt rope 56 slides into tube 52 with the edges of layers 40 and 42 passing through the channel formed by tube 52 and longitudinal slot 54, thereby attaching structure 30 to door 12. A similar arrangement is used to attach structure 32 to door 14.

Figure 5:
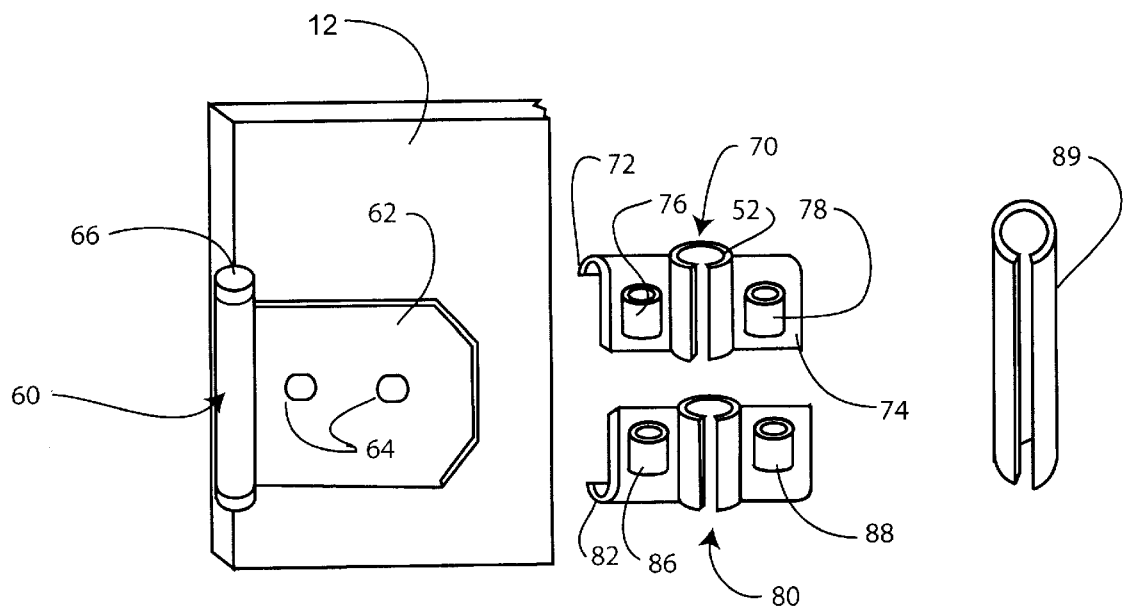
FIG. 5 shows an alternate means of attaching the structure to the trailer that enables ready transfer to other trailers.

In the alternate attachment means of FIG. 5, a conventional pivoting bracket 60 has a tongue 62 attached to the left side of left door 12 by rivets 64 or other conventional means such as threaded fasteners. Tongue 62 pivots about a pivot rod 66 and another tongue (not shown) also pivots about rod 66 and extends along the side of the trailer where it is attached to the trailer in a manner like that shown for tongue 62. Several brackets attach each door to the trailer and enable each door to swing into open and closed positions about a vertical axis along the left and right sides respectively of the trailer.

A J-shaped clamp 70 has an inwardly extending portion 72 that fits along the top edge of tongue 62 and a leg portion 74 that extends along the face of tongue 62. Leg portion has vertically oriented cylindrical members 76 and 78 along each side of a slotted circular tube 52 having a longitudinal slot 54 as described previously.

Clamp 70 is positioned against tongue 72 with its inwardly extending portion 72 engaging the top edge of the tongue. Another clamp 80 that essentially is an inverted version of clamp 70 is positioned against tongue 62 with its inwardly extending portion 82 engaging the lower edge of tongue 62. The cylindrical members of clamp 80, which are designed by numerals 86 and 88, have internal screw threads for engaging threaded fasteners. Threaded fasteners (not shown) are inserted into and extend through the cylindrical members 76 and 78 and are tightened into the internal screw threads of cylindrical members 86 and 88 to bring clamps 70 and 80 together so the clamps attach firmly to tongue 62.

Clamps 70 and 80 are attached to each of the brackets 60 that is located along the side of the door and an elongated cylindrical tube 89 is fitted into tubes 52 of each of the clamps. Bolt rope 56 then is inserted into tube 89 as described in connection with FIG. 4.

Layers 40 and 42 can be made of sheets of polymeric materials such as polyethylene, dacron, nylon (polyamide), or hypalon (chlorosulfonated polyethylene). Reinforcing and stiffening materials such as carbon fiber or fiberglass can be included in the polymeric material to achieve the desired durability and abrasion resistance.

In a suitable construction, layers 40 and 42 are made of chlorosulfonated polyethylene having a thickness of one mm. Thread 46 is polyester or polyamide material and is of sufficient length to maintain layers 40 and 42 about fifty millimeters apart when interior portion 44 is inflated to fifty to one hundred kilopascals (seven to fourteen psi). Fibrous material 48 is a carbon fiber taffeta that is bonded to the inner surfaces of layers 40 and 42 to form a structural sandwich that maintains much of its shape even in the absence of any inflation pressure within interior portion 44.

Figure 6:
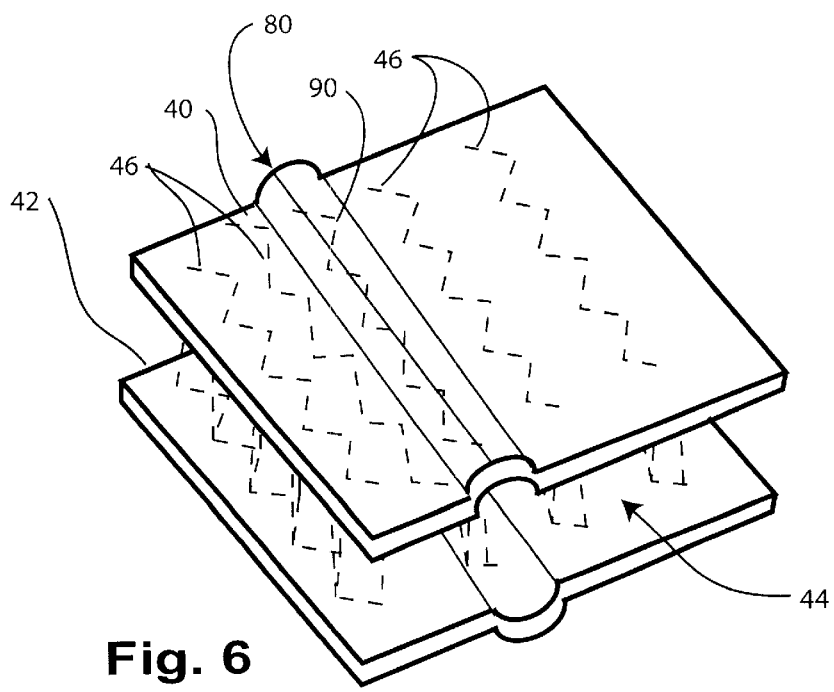
FIG. 6 shows a cross section of the flexible material used in the structure that has a ridge built into the layers to improve airflow characteristics.

Ridges 80 indicated generally in FIGS. 1 and 2 can be formed in the structure to help achieve the desired shape and improve airflow. Ridges 80 are formed by increasing the lengths of the threads along essentially vertical lines through layers 40 and 42. As shown in FIG. 6, threads 90 have an increased length relative to threads 46 and inflation of interior portion 44 extends the threads to form a ridge 80 in the material. With similar techniques, shallow grooves can be formed in the layers. The ridges and grooves can be of varying height and shape and can space layers 40 and 42 at less than twenty-five millimeters or enable the layers to separate by more than seventy-five mm, and with proper design assists in maintaining laminar airflow over the structure during the varied conditions caused by cross-winds and buffeting encountered in highway operation. Ridges and grooves also can be used to help achieve additional stiffness without increasing the overall weight of the structure.

When trailer 10 is loaded and ready for interstate highway operation, doors 12 and 14 are closed and the interior portions 44 of structures 30 and 32 is pressurized through the nozzles to the desired pressure. During pressurization a length of velcro 92 (FIG. 1) is applied to hold the facing portions of structures 30 and 32 together. Various alternatives to velco, including a zipper or magnetic means, can be used to attach the facing portions together to achieve improved continuity of the structure across the rear end of the trailer.

A relatively small amount of air is required as interior portions 44 are relatively small in comparison to the volume 60 (shown in FIG. 2) that is contained by the structures. Seams that bring the layers into physical contact with each other at various points also can be used to provide the desired shape and rigidity and help to smooth airflow over the structure. Alternatively multiple structures can be attached to each other to achieve the desired shape.

What is claimed is:

1. Structure for reducing the aerodynamic drag of a vehicle comprising at least two layers of flexible material, said layers having peripheral portions and interior portions, said peripheral portions being pneumatically sealed to each other, connecting and restraining means for connecting the interior portions of the layers to each other while restraining separation from each other for a controlled distance so that the interior portions of the layers are in a spaced relationship to each other, and air admitting means for inflating the space between the interior portions of the layers to impose tension within the connecting means, thereby producing an essentially rigid and light weight structure having a shape that minimizes air turbulence when attached to a vehicle.

2. The structure of claim 1 in which the connecting and restraining means comprises thread that passes through the layers at multiple locations to maintain the layers within twenty-five to seventy-five millimeters of each other.

3. The structure of claim 2 comprising flexible rope means attached to a peripheral portion of the layers for use in attaching the structure to a vehicle trailer.

4. The structure of claim 3 comprising fibrous material attached to the layers within the interior portions formed by the layers.

5. The structure of claim 4 in which the layers are made of polyethylene, polyamide, or chlorosulfonated polyethylene.

6. The structure of claim 5 in which the connecting and restraining means maintain the layers within approximately fifty millimeters of each other.

7. The structure of claim 1 comprising fibrous material attached to the layers within the interior portions formed by the layers.

8. The structure of claim 1 in which the layers are made of polyethylene, polyamide, or chlorosulfonated polyethylene.

9. The structure of claim 1 comprising connecting and restraining means of variable length to form vertical lines of ridges or grooves.

10. A vehicle having improved aerodynamic airflow during highway operation comprising a structure attached to the rear end of the vehicle, said structure comprising at least two layers of flexible material, said layers having peripheral portions and interior portions, said peripheral portions being pneumatically sealed to each other, connecting and restraining means for connecting the interior portions of the layers to each other while restraining separation from each other for a controlled distance so that the interior portions of the layers are in a spaced relationship to each other, air admitting means for inflating the space between the interior portions of the layers to impose tension within the connecting means, thereby producing an essentially rigid and light weight structure having a shape that minimizes air turbulence when attached to a vehicle, flexible rope means attached to a peripheral portion of the structure, and channel means attached to the vehicle for receiving the flexible rope means.

11. The vehicle of claim 10 comprising fibrous material attached to the layers within the interior portions formed by the layers.

12. The vehicle of claim 11 in which the layers are made of polyethylene, polyamide, or chlorosulfonated polyethylene.

13. The vehicle of claim 10 comprising connecting and restraining means of variable length to form vertical lines of ridges or grooves.

14. The vehicle of claim 10 in which the connecting and restraining means comprises thread that passes through the layers at multiple locations to maintain the layers within twenty-five to seventy-five millimeters of each other.

15. A vehicle having improved aerodynamic airflow during highway operation comprising rear doors that swing into opened and closed positions about vertical axes located at the edges of the doors and aerodynamic structure attached to each of the rear doors, said structure comprising at least two layers of flexible material, said layers having peripheral portions and interior portions, said peripheral portions being pneumatically sealed to each other, connecting and restraining means for connecting the interior portions of the layers to each other while restraining separation from each other for a controlled distance so that the interior portions of the layers are in a spaced relationship to each other, air admitting means for inflating the space between the interior portions of the layers to impose tension within the connecting means, thereby producing an essentially rigid and light weight structure having a shape that minimizes air turbulence, flexible rope means attached to a peripheral portion of each structure, and channel means attached to the rear doors of the vehicle for receiving the flexible rope means.

16. The vehicle of claim 15 comprising pivoting brackets that attach the rear doors to the vehicle and in which the channel means comprises clamps that attach to the brackets.

17. The vehicle of claim 16 comprising fastening means for fastening the structures attached to each door together when the doors are closed.

18. The vehicle of claim 17 comprising connecting and restraining means of variable length to form vertical lines of ridges or grooves.

19. The vehicle of claim 15 comprising fastening means for fastening the structure attached to each door together when the doors are closed.

20. The vehicle of claim 15 comprising connecting and restraining means of variable length to form vertical lines of ridges or grooves.

* * * * *